United States Patent [19]

Swanson et al.

[11] 3,909,010
[45] Sept. 30, 1975

[54] CORROSION PROTECTIVE COLLAR FOR UNDERGROUND PIPE JOINTS WITH METAL PARTS

[75] Inventors: Harold V. Swanson, Morris Plains; Robert E. Bald, Roseland, both of N.J.

[73] Assignee: Interpace Corporation, Parsippany, N.J.

[22] Filed: May 14, 1973

[21] Appl. No.: 359,967

[52] U.S. Cl. .................. 277/1; 277/9; 277/230; 277/DIG. 2; 285/284
[51] Int. Cl. ............................................ F16j 15/10
[58] Field of Search .......... 277/1, 207 A, 229, 230, 277/DIG. 2, 237, 227, 9, 9.5; 285/284, 231, 345

[56] References Cited
UNITED STATES PATENTS

| | | | |
|---|---|---|---|
| 803,738 | 11/1905 | Baker | 285/284 |
| 1,662,603 | 3/1928 | Ferguson | 277/230 |
| 2,140,672 | 12/1938 | Gray et al. | 277/1 |
| 2,309,658 | 2/1943 | Miller | 277/1 |
| 2,662,555 | 12/1953 | Hirsh | 277/207 A |
| 3,095,619 | 7/1963 | Peterson | 277/1 |
| 3,318,620 | 5/1967 | Cullen et al. | 285/284 |
| 3,503,633 | 3/1970 | Braun et al. | 285/284 |
| 3,771,175 | 11/1973 | Goettl | 277/DIG. 2 |

Primary Examiner—Robert I. Smith
Attorney, Agent, or Firm—Charles E. Baxley, Esq.

[57] ABSTRACT

A method of protecting pipes with bell and spigot joints (having metal parts) from corrosion by fitting between the spigot and bell at least one dry band of open celled material (preferably reticulated polyurethane foam) having a particulate alkaline material (preferably Portland cement) impregnated therein and engaging the band between the bell and the spigot. On wetting of the band, the alkaline material is hydrated to protect the metal.

13 Claims, 5 Drawing Figures

3,909,010

CORROSION PROTECTIVE COLLAR FOR UNDERGROUND PIPE JOINTS WITH METAL PARTS

INVENTION

This invention relates to underground pipes or conduits. It relates particularly to joints in underground pipes having metallic parts and to protection of such joints from corrosion. In the usual practice of laying pipes for underground service, the lengths of the pipe are placed in an open trench with a spigot end of one length fitted into a bell end of an adjoining length. One such type of underground pipe is made of reinforced or prestressed concrete fitted with a steel bell ring at one of its ends and a steel spigot ring at its other end. Generally the spigot ring has an annularly formed groove into which is positioned a rubber gasket. When the spigot containing the gasket is inserted into the next bell, the rubber gasket is compressed between the spigot groove and an inside annular face of the bell, thus effecting a joint with a watertight seal. Because of necessity of providing this means of joining and compressing the gasket, adjacent portions of the bell and spigot ring necessarily are exposed and may be subjected to corrosive influences depending upon character of enveloping soil and moisture.

A diaper-like form of burlap or the like (and generally referred to as a "diaper") then is applied around the joint and Portland cement grout is poured therein. When installed properly, this method of joint protection offers an excellent means of assuring long-term protection of the joint. However, both field and laboratory experiments have shown that there has been a lack of proper workmanship in using the method, with the result that the full value of this method has not been realized. In part this lack is due to difficulty involved in proper practice of the method and in part to inability of providing foolproof inspection of the joint prior to its burial.

Another disadvantage of protecting the joint with mortar poured into a diaper is excessive cost. A contractor is obliged to use at least one extra man performing the operation even in the smallest of pipe sizes. For larger pipe sizes a larger crew is needed together with necessary mixing and logistical support equipment. A further disadvantage is a requirement that excavated trenches which fill with water, generally percolating in from surrounding soil, must be dewatered prior to placement of the diaper and pouring of the grout. Yet another disadvantage of this method is a difficulty that grout pouring crews have in maintaining a proper sequence of trenching, pipe joining and backfilling. It is usual, therefore, to have excessively long lengths of open trenches with exposed joints being readied for grouting. Long lengths of open trenches pose hazards to the public and present an unsightly appearance.

It is accordingly an object of the present invention to provide a method of protecting effectively the steel joints of underground pipes.

It is another object of the present invention to provide a method of protecting the joints of underground pipes which method is simple to use.

It is still another object of the present invention to provide an inexpensive method of protecting the joints of underground pipes.

It is still another object of the present invention to provide a method of protecting steel joint rings which is virtually foolproof and which can be checked easily for proper application.

It is still another object of the present invention to provide a more rapid method of protecting underground steel pipe joints so as to minimize the length of time a trench must be kept open.

It is still another object of the present invention to provide a method of protecting underground steel pipe joints when the pipe trench contains water.

In accordance with the method of the present invention, a dry spigot band is placed over the spigot and onto the metal spigot ring. The spigot band is elastic, flexible and made preferably of a reticulated polyurethane foam which is impregnated with a highly alkaline agent such as Portland cement. After the spigot band has been placed properly on the spigot, the spigot is inserted in the usual manner into the bell of a previously laid length of pipe. The band is thus compressed within the joint recess in the space between the bell and spigot rings. Any water which enters the joint recess will hydrate the Portland cement, thereby releasing its alkalinity and corrosion inhibiting properties.

Although protection of the steel joint rings from corrosive ground water entering the exterior joint recesses is a primary objective toward insuring maintenance-free service of a buried pipeline, aggressive fluids being transported through the pipeline may require the inner joint ring surfaces to be protected similarly by an alkaline environment. This is accomplished by inserting bell bands into the annular joint openings on the interior of the pipe to protect the inwardly exposed portions of the steel joint rings. Such a bell band may stay in place due to its own rigidity. Alternatively, this bell band may have an adhesive surface and may be secured to the interior face of the steel bell ring, concrete bell seat or concrete spigot end prior to joining the pipe. These techniques for placing the bell band omit necessity of workmen entering the interior of the pipe (after jointing) to mortar the inside of the joint.

DESCRIPTION OF PREFERRED EMBODIMENT

Figure 1:
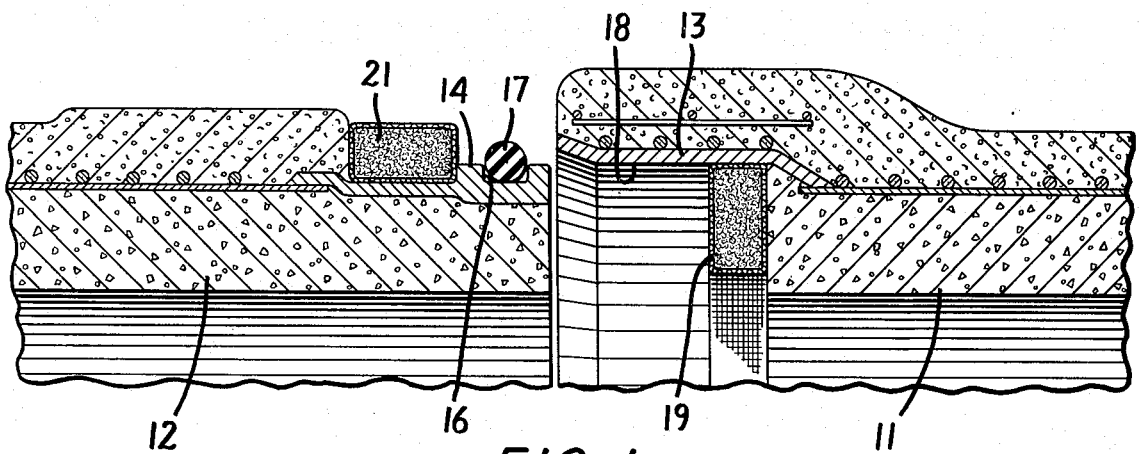
FIG. 1 is a partial vertical sectional view of a rubber and steel pipe connection for a reinforced concrete pipe joint with metal bell and spigot rings spaced apart from each other.

Referring to the drawing which illustrates a preferred embodiment of this invention, pipes 11 and 12 generally are made of reinforced concrete or prestressed concrete and are fitted respectively with a steel bell ring 13 and a steel spigot ring 14 at their respective ends. The spigot ring 14 has an annularly formed groove 16 into which is positioned a rubber gasket 17. When the spigot ring 14 with the rubber gasket 17 thereon is inserted into the bell ring 13, the rubber gasket 17 is compressed in the spigot ring groove 16 by an inside annular face 18 of the bell ring 13, thus effecting a watertight seal therebetween.

Figure 2:
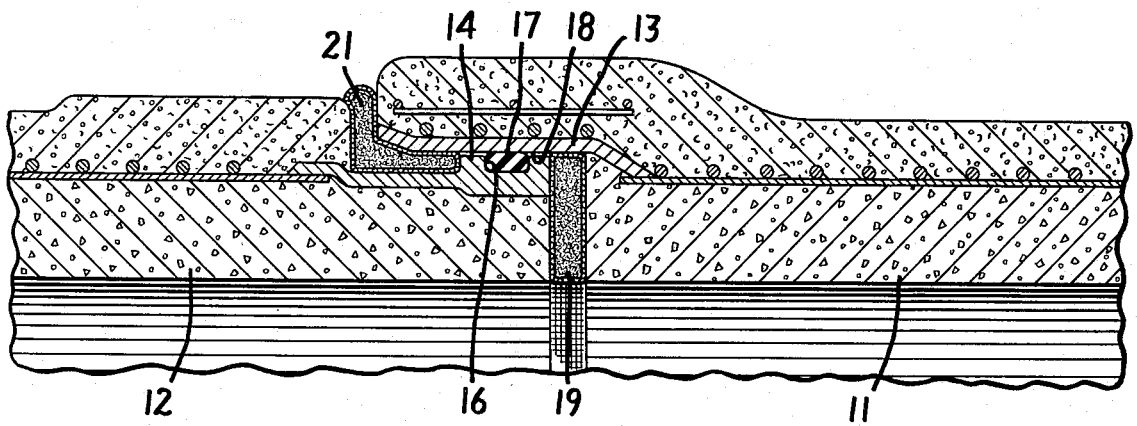
FIG. 2 is the same as FIG. 1 with the spigot engaged into the bell.

Because of the telescoping action of the steel bell ring 13 and the steel spigot ring 14 in compressing the rubber gasket 17 therebetween, portions of the bell and spigot rings 13,14 are necessarily exposed and may be subject to corrosive influences. Protection of the steel rings 13,14 is achieved by means of a bell band 19 and a spigot band 21 preferably of reticulated polyurethane foam which are impregnated with dry Portland cement. When the spigot ring 14 is inserted into the bell ring 13, bell band 19 and spigot band 21 are compressed between the pipes 11 and 12 as seen best in FIG. 2.

The spigot band 21 is stretched and pulled over the steel spigot ring 14 as shown in FIG. 1. The bell band 19 preferably is connected to the pipe 11 by means of a suitable adhesive. On insertion of the spigot ring 14 into the bell ring 13, the outer and inner portions of the joint have the spigot band 21 and bell band 19 positioned respectively to protect the steel bell and spigot rings 13,14. When ground water contacts the band 21, the Portland cement (or other particulate alkaline material) impregnated therein is hydrated, thereby activating its alkalinity and corrosion inhibiting properties. Similarly, the fluid in the pipeline activates the corrosion inhibiting properties of the bell band 19. By this expedient, exposed portions of the steel bell and spigot rings 13,14 are protected.

Figures 3, 4, 5:
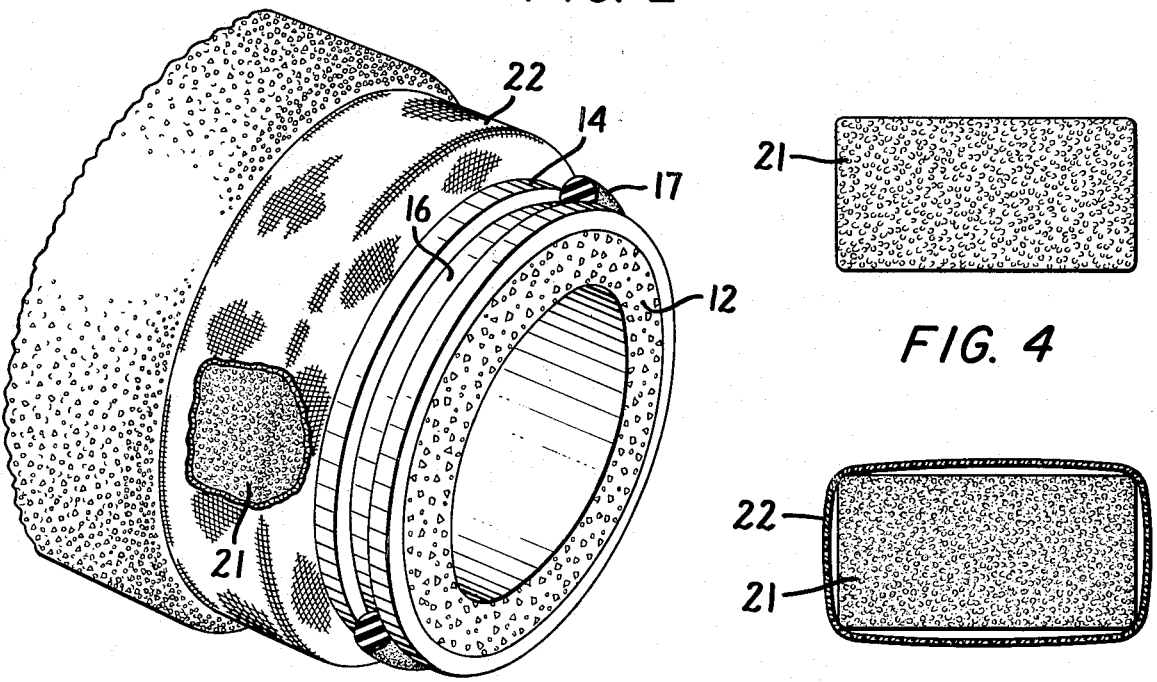
FIG. 3 is a perspective view of a spigot band according to this invention and applied to a metal spigot ring.
FIG. 4 is a sectional view of a reticulated foam spigot band according to this invention.
FIG. 5 is a sectional view of the reticulated foam spigot band encased in a fabric sheath.

Several systems, which can take a reticulated or network form; such as felt, wool, polymer fibers or open celled polymers; may be used to make bands 19,21. Usable polymers include vinyl, butadiene, styrene, urethane polymers, and the like. Foamed polyurethane is preferred. In one embodiment, the reticulated polyurethane foam used in the gasket is about 1 by 2 inches in cross section and has about 45 pores per square inch of surface. This polyurethane foam is seen in FIG. 4 and its cross-section carries about 5.5 ounces of Portland cement per linear foot. The foam can hold larger amounts of Portland cement, but such additional amounts of Portland cement do not increase effectiveness of the method of the present invention. The foam band may be surrounded by a water-soluble or water-porous member 22 as shown in FIG. 5 to reduce cement loss during shipping and placing, yet allowing water to pass through it for hydrating the Portland cement.

While alkaline agents other than Portland cement may be used, Portland cement is believed to be the most effective and economical of such alkaline agents.

The materials for the band are all commercially available. Reticulated polyurethane foam, for example, is manufactured by the Scott Paper Company's Foam Division in Chester, Pennsylvania. The Portland cement is conventional and is available widely. A non-woven polyester fabric for sheath 22 is obtainable from a wide variety of suppliers. All the separate materials are assembled by a fabricator skilled in the art of commercial textile production.

Each band preferably is packed individually in a waterproof plastic bag so as to avoid premature hydration of the Portland cement. A number of such bags are packaged into a cardboard container and the container is shipped to the field.

Field investigations of joints protected by the method of the present invention, in different types of soils for significant periods of time, have shown that this method protects effectively against corrosion. These investigations have demonstrated also that this method is readily and easily performed by relatively inexperienced personnel. Where bell and spigot bands of reticulated polyurethane foam impregnated with Portland cement are used in accordance with the present invention, no additional protection to the joint is required and most particularly application of grout to the outside of the joint and mortar to the inside of the joint are obviated.

It will be understood by those familiar with pipe design and installation that wide deviations may be made from the foregoing preferred embodiment without departing from the main theme of invention set forth in the following claims.

We claim:

1. A method for protecting from corrosion a pipe with ferric metallic components and having a bell and a spigot, the method comprising steps as follows:
   impregnating a distortable band of a cellular water invadable material with a dry hydratable cement which is reactive with water to hydrate thereby forming an alkali releasing water impervious substance,
   placing the band between the spigot and the bell,
   engaging the band in the joint by inserting the spigot into the bell,
   allowing the band to be contacted with water whereby the hydration takes place.

2. The method of claim 1 with the band arranged annularly around the spigot.

3. The method of claim 2 with the band being a reticulated polyurethane foam.

4. The method of claim 1 with the cement being Portland cement.

5. The method of claim 1 and providing a water-permeable sheath about the band to contain the cement.

6. The method of claim 5 with the cement being Portland cement.

7. The method of claim 5 with the sheath being a nonwoven polyester fabric.

8. The method of claim 1 with the band arranged annularly in the bell.

9. The method of claim 8 with the band being made of a reticulated polyurethane foam.

10. The method of claim 8 with the cement being Portland cement.

11. The method of claim 8 and providing a water-permeable sheath about the band to contain the cement.

12. The method of claim 11 with the cement being Portland cement.

13. The method of claim 11 with the sheath being a nonwoven polyester fabric.

* * * * *